Aug. 9, 1932.   C. PERUZZINI   1,870,379
WEIGHING MACHINE
Filed Nov. 2, 1928
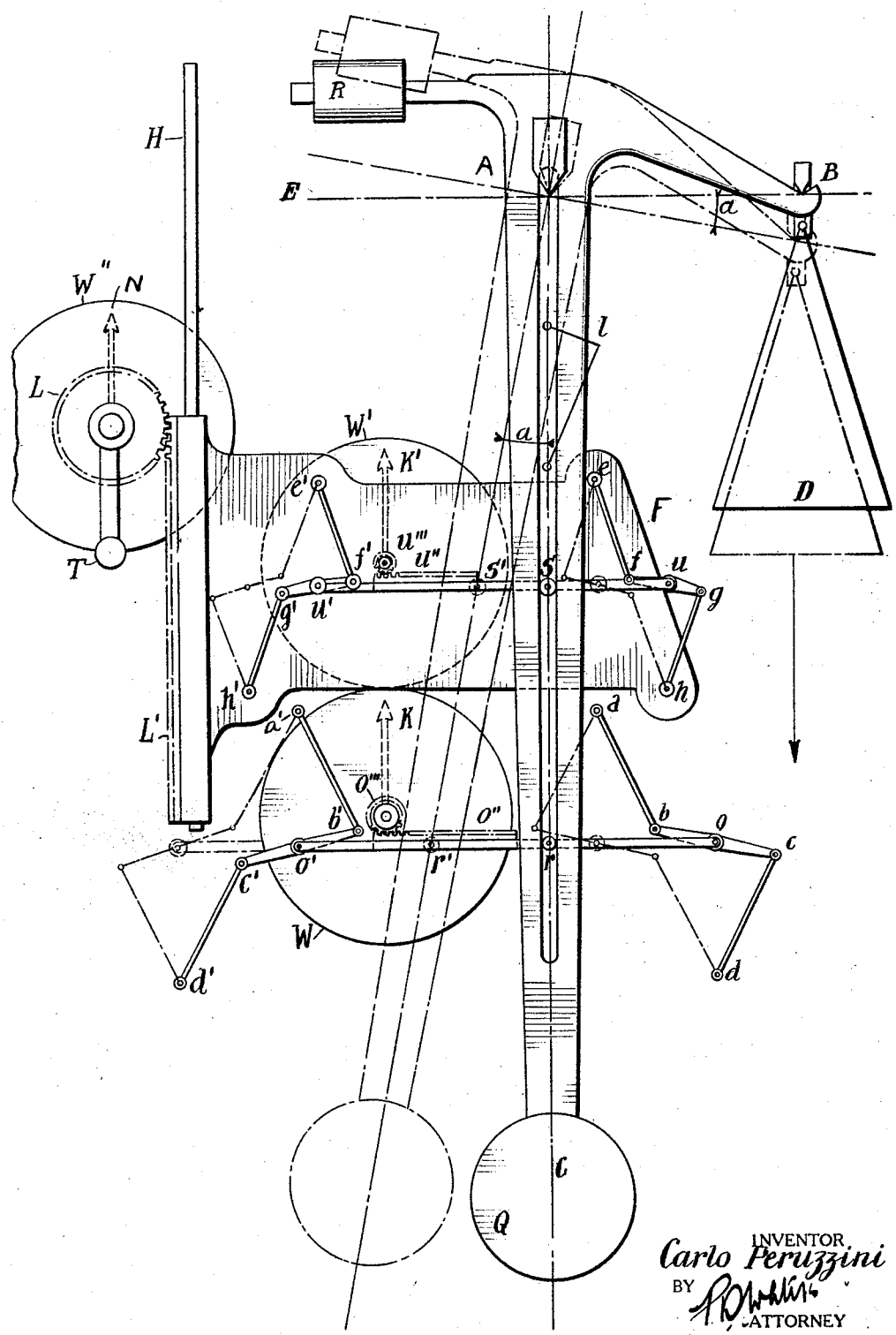
INVENTOR
Carlo Peruzzini
BY
ATTORNEY Patented Aug. 9, 1932

1,870,379

UNITED STATES PATENT OFFICE

CARLO PERUZZINI, OF MILAN, ITALY

WEIGHING MACHINE

Application filed November 2, 1928, Serial No. 316,669, and in Italy November 9, 1927.

This invention comprises improvements in automatic weighing machines which, in addition to indicating the weight, are adapted upon being set in accordance with the price per unit of weight to indicate also the total value of the goods weighed.

It has heretofore been proposed to embody in the transmission of these machines, angled levers of pendulous nature from which motion has been transmitted to the weight and value indicating devices through a toothed sector and a pinion, the movement of such indicating devices due to the weight factor thus being determined by the circular movement of the sector.

The principal object of the present invention is to provide an improved machine which enables immediate indication of the value of the goods weighed to be obtained with increased accuracy and over a relatively large working range without necessity for calculation, and further objects in view are simplicity of construction, the minimizing of friction and adaptability of the machine for adjustment to suit the various unit prices without prior setting of the parts to zero position.

According to this invention, the improved machine comprises an angled lever device fulcrumed at the angle and having one arm in the form of a pendulum and another arm adapted to be subject to the influence of the weight of the goods, and weight and value indicating devices operatively connected with the pendulum arm of the lever device and adapted to receive therefrom displacements proportional to the trigonometric tangent of the angle through which the lever device is moved under the action of the weight of the goods. The tangent being the determining factor in the operation of the weight and value indicating devices, the operation of these latter is in proportion to the weight irrespective of the amplitude of the angle of movement of the lever device and thus close accuracy of indication is assured.

The angled lever device may comprise effective arms disposed at 90° apart, with the pendulum arm balanced vertically in the normal position or position of rest, and the weight and value indicating devices may comprise operating parts which are guided horizontally in their movement and are connected to the pendulum arm of the angled lever device. This is a simple construction which may be further simplified by arranging for the scale pan or the like to act on the weight arm of the angled lever device at a fixed point instead of having sliding engagement therewith. It will also be realized that the simplicity tends towards the minimizing of friction. Finally, arrangement is made whereby the price-per-unit indicating device may be adjusted independently of the position taken up by the pendulum under the action of the weight so that adjustment is possible whether the scale is loaded or not and it is not necessary to set the parts to zero position.

The accompanying drawing shows one example of construction of an automatic weighing machine according to the invention.

The improved machine comprises a pendulum in the form of angled lever B A C, with effective arms at an angle of 90° apart and fulcrumed at the apex A of the angle.

The arm A C supporting the pendulum mass Q is provided with a longitudinal groove $l$ or like rectilinear guide part and the lever is equilibrated by a mass R so that when the scale-pan is empty the axis of the groove $l$ will be exactly vertical.

Two rollers $r$ and $s$ can run in the groove $l$ without friction or appreciable lateral play, in such a way that the axis of the rotation of the rollers will coincide continually with the axis of the groove. These rollers $r$ and $s$ are pivoted and supported on two bars $o$ $o'$ and $u$ $u'$ which are guided by means of hinged balance beams ($a$ $b$ $c$ $d$; $a'$ $b'$ $c'$ $d'$ and $e$ $f$ $g$ $h$; $e'$ $f'$ $g'$ $h'$), in such a way that the axes of motion of the bars $o$ $o'$ and $u$ $u'$ are perfectly horizontal or at 90° to the vertical axis of the groove $l$. These guiding parts must also be equilibrated so that whatever may be the position of the bars there will be no reaction due to the position of the weights tending to produce horizontal displacements of the bars along their axes of motion.

The bar $u$ $u'$ together with the roller $s$ and corresponding horizontal guiding members is carried by a support F by means of which all these parts can be moved vertically while always keeping $uu'$ horizontal so that the roller $s$ will run in the vertical groove $l$ without producing any horizontal displacement of the bar $uu'$. The support F engages the vertical guide H and is moved to the desired position by turning a handle T which is attached to and turns a gear L. The gear L engages a rack L' mounted on the support F. A finger N also turns with handle T and gear L moving over a stationary graduated dial W''.

By means of the support F all the parts which it carries can be displaced vertically, from the position shown in the drawing to a position where the axis of the bar $uu'$ and the axis of the roller $s$ coincides with the horizontal line EB and with the fulcrum A of oscillation of the pendulum.

The other arm A B of the angled lever, which carries on its end B the balanced scale-pan of the scales, is disposed so that when the scales are empty and the groove $l$ vertical, the fulcrum A of oscillation of the pendulum and the point of support B of the scale pan, will lie in the same horizontal plane and therefore at 90° with the axis of the groove $l$ of the pendulum A C.

In operation, the various parts being in the position shown, a weight P placed on the scale-pan D of the scales will act at the point B of the arm AB producing an angular displacement $\alpha$ of the angled lever, and equilibrium of the system will be attained when the moment of the weight P ($P \times AB \times \cos \alpha$) is equal to the moment of the counterweight Q ($Q \times AC \times \sin \alpha$), that is when $$P \times AB \times \cos \alpha = Q \times AC \times \sin \alpha$$

whence $$P \times AB = Q \times AC \times \tan \alpha$$

and $P = \dfrac{Q \times AC}{AB} \tan \alpha$

As Q, AC and AB are constants for the construction, the ratio $$\frac{Q \times AC}{AB}$$

will be constant, so that the tangent of the angle of deviation of the pendulum AC from the vertical under the action of the weight will always be proportional to the weight put on the scale-pan.

The angular displacement of the pendulum owing to the weight will make the roller $r$ move from say $r$ to $r'$, and as $r$ can only move on a horizontal line, or at 90° to the vertical, and always has its axis of rotation in the groove $l$, no effect produced by the position of the various parts can affect the value of $r r'$, if by suitable precautions in construction, friction and play between the roller and the groove are reduced to a negligible minimum. The said value therefore will be proportional to the tangent of the angle $\alpha$ and thus to the weight placed on the scale pan of the scales according to constant ratio.

At the same time as the roller $r$ is moved the roller $s$ will also be moved from $s$ to $s'$ under the action of the weight P, and as lateral displacements of $s$ take place on the horizontal line $uu'$ parallel to the line $oo'$ of motion of the roller $r$, the value $ss'$ analogously with what has been said about the value $rr'$, should also be in proportion to the tangent of the angle according to a specified ratio.

This ratio, however, will not be constant but will depend upon the distance $As$ at which the roller $s$ is situated from the axis of oscillation of the pendulum, so that the values for the displacements $ss'$ will be proportional both to the tangent of the angle of deviation of the pendulum and to $As$, beginning with zero, which is the position when the centre of rotation of $s$ coincides with A.

In fact, considering the similar triangles $A s s'$ and $A r r'$ we have:

$$As : Ar :: s s' : r r'$$

whence $$ss' = rr' \times As \times \frac{1}{Ar}$$

$Ar$ being constant, the ratio $1 : Ar$ will also be constant so that if $As$ represents the price of the goods per unit of weight, since $rr'$, as already demonstrated, is proportional to the weight and can therefore represent the said weight, the value $ss'$ will represent in the constant ratio $1 : Ar$ the product of weight and the price of the goods per unit of weight, or the value of the weight P of the goods, the price of which is $As$ per unit of weight.

Summarizing what has been said, it may be noted that in such a system as that described and shown:

(a) horizontal displacement of the roller $r$ will be proportional to the weight put on the scale-pan.

(b) vertical displacement of the support F and thus of the roller $s$ will be in proportion to the price of the goods for each unit of weight.

(c) horizontal displacement of the roller $s$ will be in proportion to the product of the weight of goods and the unit price or in proportion to the value of the goods weighed.

If the maximum displacement $rr'$ be divided into a certain number of equal parts X, each part X will represent a fraction of the maximum weight P; correspondingly by dividing the maximum displacement $As$ into a certain number of equal parts Y, each of the latter will represent a fraction of the maximum price of the goods for every unit of weight; and by dividing the maximum displacement $ss'$ into a certain number of equal parts $Z = X \times Y$, the displacement of $s$ in each position will be in proportion to the product of the weight and the unit price and give the value of the goods weighed.

A rack $o''$ is mounted on the bar $o\ o'$ and engages the toothed gear $o'''$ which is directly connected to the finger K. Said finger K moves in front of a stationary graduated dial W indicating thereon the horizontal displacement of the roller $r$. Similarly, a rack $u''$ is mounted on the bar $u\ u'$ in engagement with a toothed gear $u'''$ directly actuating a coaxially mounted finger K'. This finger K' moves in front of another stationary graduated dial W' indicating thereon the horizontal displacement of the roller $s$. Whereas the actuation of finger N in front of graduated dial W'' corresponding to vertical positions of support F has been previously developed.

Consequently the absolute weight will be indicated on the dial W by the finger K, the price per unit of weight will be set on the dial W'' by turning handle T and finger N and the total price of the particular article will be indicated on the dial W' by the finger K'. The result on dial W' will be the product of the reading on scales W and W''.

Such indications can be transmitted by means of the same axes to dials placed on each side of the machine so that the figures can be read simultaneously by the seller and the buyer.

Evidently in practice the details in construction of the invention, the form and the shape of the weights and their position and the structure and application of the indicating devices and everything relating essentially to the construction of the machine can be varied without departing from the invention. Thus, for example, the system can be employed for weighing scales with hanging pans, weighing scales with low suspension, and any type of weighing machine in which the angular deviations of an arm supporting the weighing pan or the like are equal to the angular deviations of a counterweighted pendulum arm.

Having now particularly described and ascertained the nature of my said invention, and in what manner the same is to be performed, I declare that what I claim is:

1. Automatic weighing machine adapted for indicating weight and total value of goods weighed, including a lever device having arms arranged at an angle to each other and fulcrumed at a point intermediate the relatively distant ends of the arms thereof, having one arm in the form of a pendulum and another arm adapted to be subject to the weight of the goods, weight indicating means operatively connected with the pendulum and adapted to be displaced thereby, value indicating means comprising a member operatively connected with said pendulum and displaceable thereby and symmetrically arranged hinged balance beam mechanisms supporting said member, and adjusting means associated at one point with said pendulum for vertically moving said value indicating means to a position corresponding to a price per unit of weight, said adjustable means having its point of association with the pendulum variable with respect to the pivot of the latter.

2. Automatic weighing machine adapted for indicating weight and value of goods weighed, including in combination a pendulum device, displaceable by the weight of the goods, and indicating mechanism including a member operatively connected with the pendulum and displaceable thereby and a pair of symmetrically arranged hinged balance beam mechanisms supporting said member, said member being disposed intermediate said mechanisms.

3. Automatic weighing machine adapted for indicating weight, price per unit, and total value of goods weighed, including in combination a pendulum device displaceable by the weight of the goods being weighed, a member operatively connected with the pendulum and displaceable thereby, symmetrically arranged link mechanisms supporting said member allowing horizontal motion thereof weight indicating mechanism associated with said weighing machine, gear means operatively connecting said indicator mechanism and said member, a second member operatively connected with the pendulum, symmetrically arranged link mechanisms supporting said second member allowing horizontal motion thereof, a body serving as a mount for the last named link motion mechanisms, said body being adjustable up and down in relation to said pendulum, value indicating mechanism geared with said second member, and a price per unit indicator geared with said body.

4. Automatic weighing and value indicating machine including a pendulum actuated by the weight of goods to be weighed, an endwise movable bar, link mechanisms supporting said bar and permitting only horizontal motion thereof, a vertically adjustable support for said link mechanisms, antifriction means on said bar in lateral engagement with said pendulum but free to move along the length thereof, a value indicator and gear means operatively connecting said value indicator mechanism with said bar.

5. Automatic weighing and value indicating machine including a pendulum having longitudinal guide means, a load arm adapted when loaded for angularly displacing said pendulum, a horizontally movable bar, anti-frictional means laterally engaging said bar with said longitudinal guide means, link mechanisms supporting said bar, a vertically adjustable carrier for said link mechanisms, indicator mechanism associated with said machine and gear means operatively connecting said indicator mechanism with said bar.

6. Automatic weighing, price per unit, and value indicating machine including a pendulum having longitudinal guide means, a load arm on said pendulum, a horizontally movable bar antifrictionally engaged with said pendulum, link mechanisms supporting said bar, a weight indicator geared with said bar, a second horizontally movable bar antifrictionally engaged with the longitudinal guide means of said pendulum, link mechanisms supporting said second bar, a vertically adjustable carrier for the mechanisms last named, value indicating mechanism associated with said gear means operatively connecting said value indicating mechanism and said second bar.

7. A weighing machine, including the combination with static weight indicators means operable in situ, a scale pan and a pendulum normally disposed at rest and swingable by a weight applied to said scale pan, of a support movable toward the fulcrum of said pendulum and bearing total value indicator means operable in all positions of said support, a second static indicator means operable in situ to shift said movable support and total value indicator means and to simultaneously indicate values per unit weight of objects weighed, means connecting said pendulum operatively to said weight indicator means to directly indicate the weight of said weighed objects, and means operatively connecting said pendulum with said total value indicator means in all positions thereof in order to indicate the total value of said weighed objects in terms of products of the weight indicated upon said weight indicator means multiplied by the unit values respectively indicated upon said second static indicator.

CARLO PERUZZINI.